US012645291B2

(12) United States Patent
Lu et al.

(10) Patent No.: US 12,645,291 B2
(45) Date of Patent: Jun. 2, 2026

(54) EYEBALL TRACKING METHOD AND VIRTUAL REALITY DEVICE

(71) Applicant: GOERTEK INC., Shandong (CN)

(72) Inventors: Lihua Lu, Shandong (CN); Pengjie Wang, Shandong (CN); Pingping Wang, Shandong (CN); Jinjie Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 267 days.

(21) Appl. No.: 18/557,006

(22) PCT Filed: Dec. 14, 2021

(86) PCT No.: PCT/CN2021/137720
§ 371 (c)(1),
(2) Date: Oct. 24, 2023

(87) PCT Pub. No.: WO2022/227594
PCT Pub. Date: Nov. 3, 2022

(65) Prior Publication Data
US 2024/0231485 A1     Jul. 11, 2024

(30) Foreign Application Priority Data
Apr. 25, 2021     (CN) .......................... 202110450897.8

(51) Int. Cl.
*G06F 3/01*         (2006.01)
*G06T 7/73*         (2017.01)
(Continued)

(52) U.S. Cl.
CPC ................ *G06F 3/013* (2013.01); *G06T 7/73* (2017.01); *G06V 10/22* (2022.01); *G06V 10/25* (2022.01);
(Continued)

(58) Field of Classification Search
CPC .......... G06F 3/013; G06T 7/73; G06V 10/25; G06V 10/443; G06V 40/19; G06V 10/26; G06V 10/22
See application file for complete search history.

(56) References Cited

U.S. PATENT DOCUMENTS 10,698,479 B2     6/2020   Fan et al.
10,702,142 B1 *   7/2020   Kavusi ................. A61B 3/0041
(Continued)

FOREIGN PATENT DOCUMENTS

CN         103747236 A       4/2014
CN         104994288 A       10/2015
(Continued)

*Primary Examiner* — David Perlman
(74) *Attorney, Agent, or Firm* — Ingrassia Fisher & Lorenz, LLP

(57)                ABSTRACT
An eyeball tracking method and a virtual reality device are disclosed. The eyeball tracking method is applied to the virtual reality device, the virtual reality device comprises at least two cameras, and shooting areas of the cameras are partially overlapped. The eyeball tracking method comprises the steps of: acquiring images captured by at least two cameras at a same moment; superimposing overlapping areas in the images to obtain a target image including an eyeball area; and performing eyeball tracking according to the target image. The accuracy of eyeball tracking can be improved.

20 Claims, 5 Drawing Sheets

(51) Int. Cl.
| | | |
|---|---|---|
| *G06V 10/22* | (2022.01) | |
| *G06V 10/25* | (2022.01) | |
| *G06V 10/26* | (2022.01) | |
| *G06V 10/44* | (2022.01) | |
| *G06V 40/19* | (2022.01) | |

(52) U.S. Cl.
CPC ............ *G06V 10/26* (2022.01); *G06V 10/443* (2022.01); *G06V 40/19* (2022.01); *G06T 2207/30196* (2013.01); *G06T 2207/30242* (2013.01)

(56) References Cited

U.S. PATENT DOCUMENTS

2010/0328444 A1*  12/2010  Blixt ...................... A61B 3/145
348/78

| | | | | |
|---|---|---|---|---|
| 2015/0286037 | A1* | 10/2015 | Ono ..................... | G02B 13/002 |
| | | | | 359/749 |
| 2018/0137384 | A1* | 5/2018 | Kim ..................... | G06V 40/193 |
| 2019/0042842 | A1* | 2/2019 | Cavin .................. | G06V 40/197 |
| 2020/0128232 | A1 | 4/2020 | Hwang et al. | |
| 2021/0042995 | A1* | 2/2021 | Kohlmann ........... | G06T 3/4038 |

FOREIGN PATENT DOCUMENTS

| | | | |
|---|---|---|---|
| CN | 105141938 | A | 12/2015 |
| CN | 106469038 | A | 3/2017 |
| CN | 106527662 | A | 3/2017 |
| CN | 108027644 | A | 5/2018 |
| CN | 109087411 | A | 12/2018 |
| CN | 111524175 | A | 8/2020 |
| CN | 112416125 | A | 2/2021 |
| CN | 113190115 | A | 7/2021 |

* cited by examiner

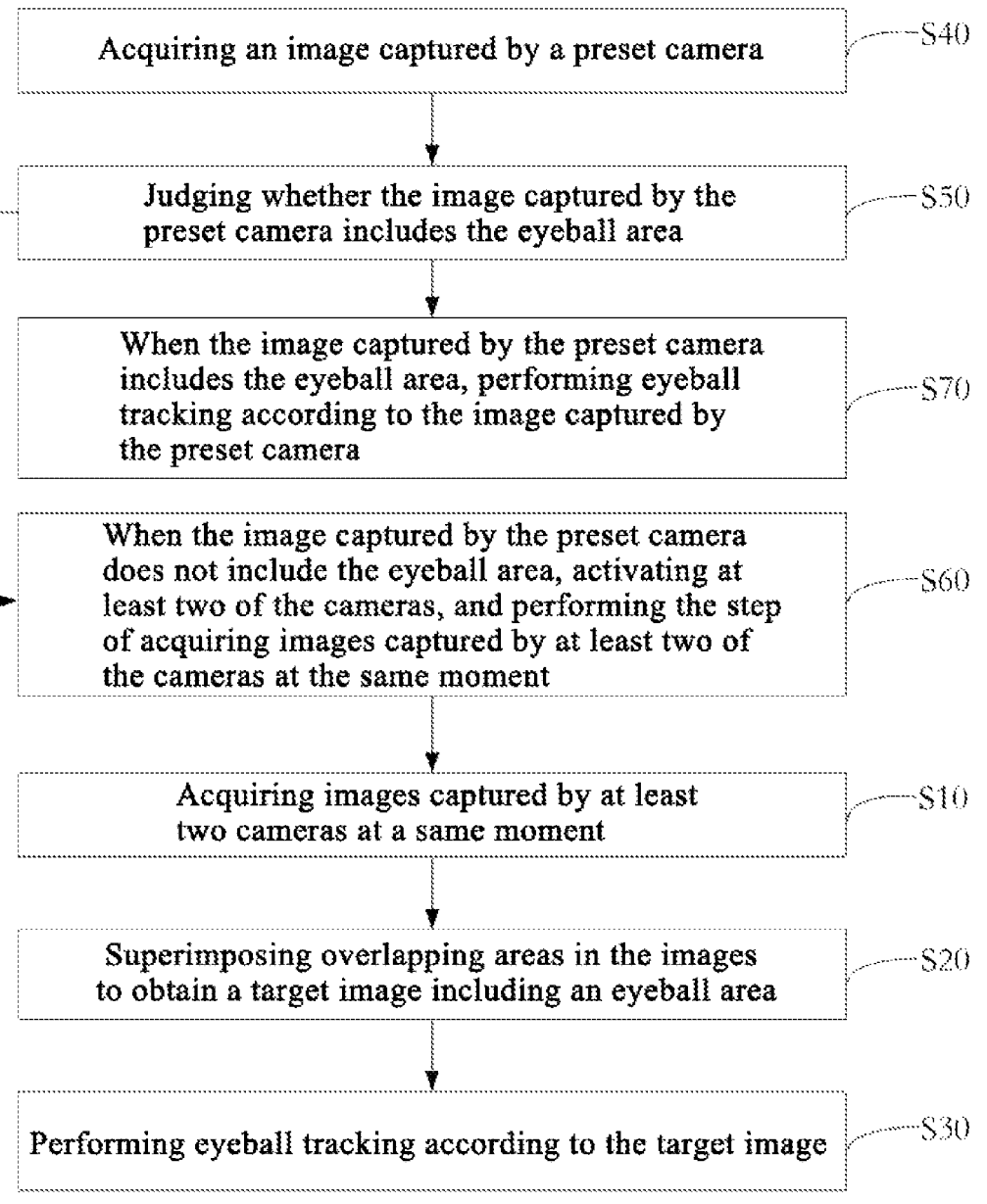

Acquiring an image captured by a preset camera — S40

Judging whether the image captured by the preset camera includes the eyeball area — S50

When the image captured by the preset camera includes the eyeball area, performing eyeball tracking according to the image captured by the preset camera — S70

When the image captured by the preset camera does not include the eyeball area, activating at least two of the cameras, and performing the step of acquiring images captured by at least two of the cameras at the same moment — S60

Acquiring images captured by at least two cameras at a same moment — S10

Superimposing overlapping areas in the images to obtain a target image including an eyeball area — S20

Performing eyeball tracking according to the target image — S30

Fig. 3

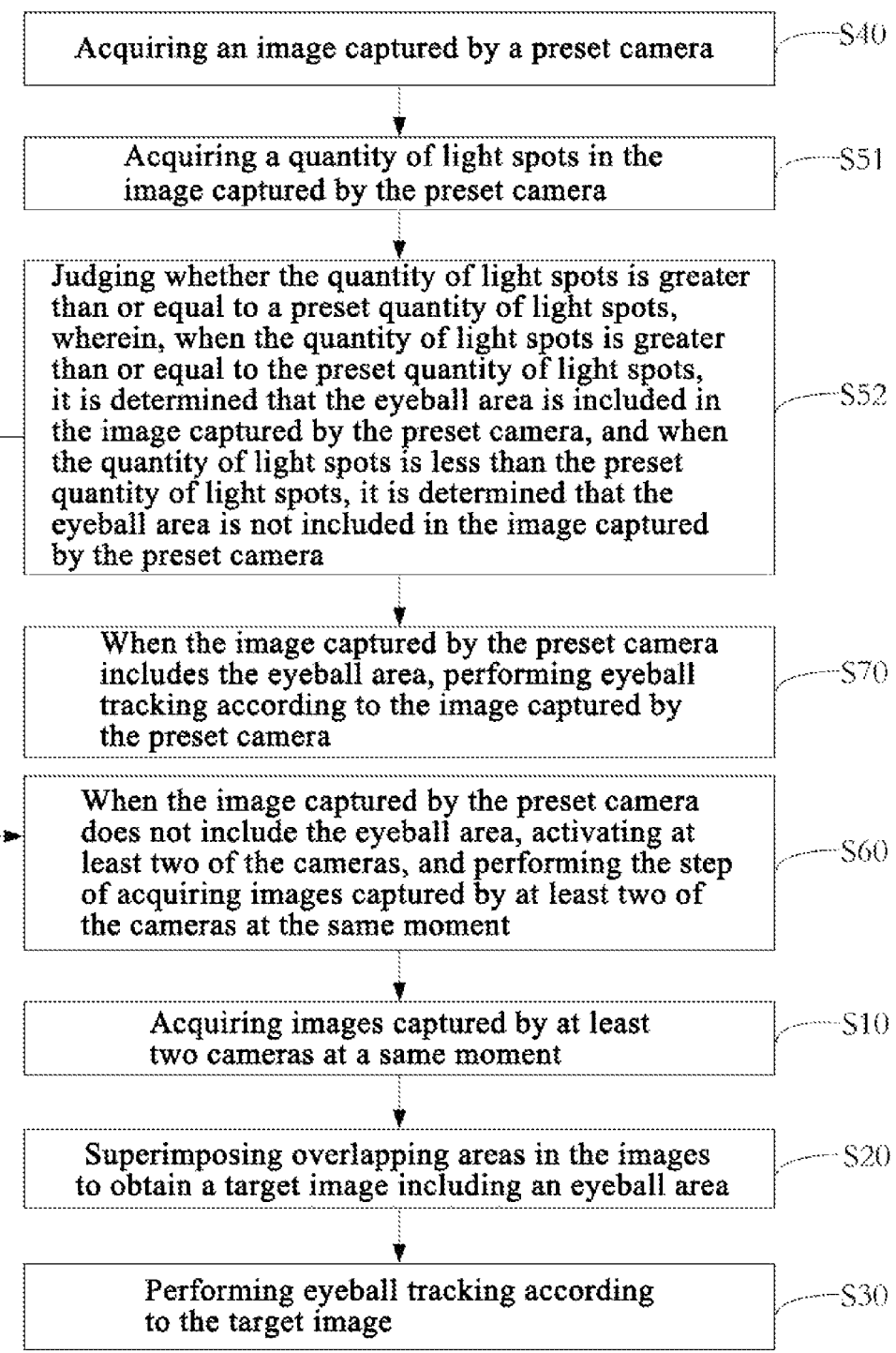

Acquiring an image captured by a preset camera — S40

Acquiring a quantity of light spots in the image captured by the preset camera — S51

Judging whether the quantity of light spots is greater than or equal to a preset quantity of light spots, wherein, when the quantity of light spots is greater than or equal to the preset quantity of light spots, it is determined that the eyeball area is included in the image captured by the preset camera, and when the quantity of light spots is less than the preset quantity of light spots, it is determined that the eyeball area is not included in the image captured by the preset camera — S52

When the image captured by the preset camera includes the eyeball area, performing eyeball tracking according to the image captured by the preset camera — S70

When the image captured by the preset camera does not include the eyeball area, activating at least two of the cameras, and performing the step of acquiring images captured by at least two of the cameras at the same moment — S60

Acquiring images captured by at least two cameras at a same moment — S10

Superimposing overlapping areas in the images to obtain a target image including an eyeball area — S20

Performing eyeball tracking according to the target image — S30

Fig. 4

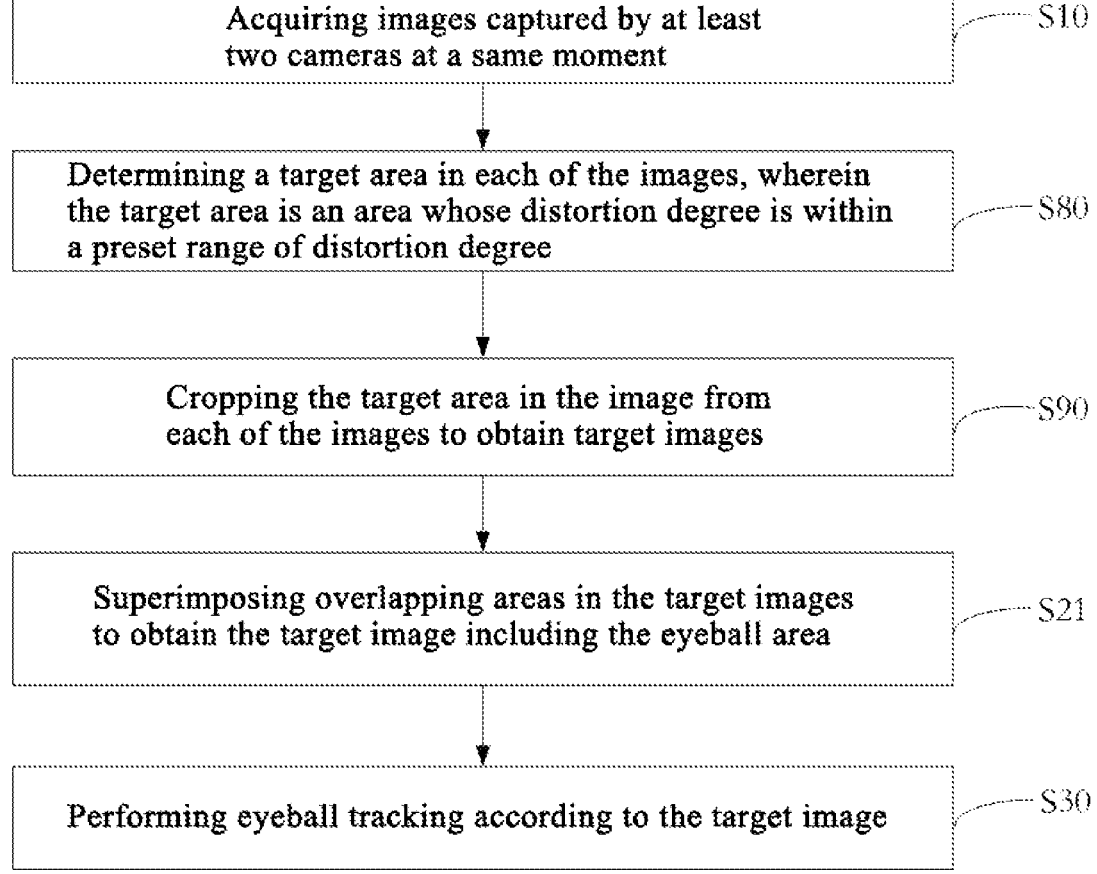

Acquiring images captured by at least two cameras at a same moment — S10

Determining a target area in each of the images, wherein the target area is an area whose distortion degree is within a preset range of distortion degree — S80

Cropping the target area in the image from each of the images to obtain target images — S90

Superimposing overlapping areas in the target images to obtain the target image including the eyeball area — S21

Performing eyeball tracking according to the target image — S30

Fig. 5

EYEBALL TRACKING METHOD AND VIRTUAL REALITY DEVICE

CROSS-REFERENCE TO RELATED APPLICATIONS

This Application is a U.S. National-Stage entry under 35 U.S.C. § 371 based on International Application No. PCT/CN2021/137720, filed Dec. 14, 2021 which was published under PCT Article 21(2) and which claims priority to Chinese Application No. 202110450897.8, filed Apr. 25, 2021, which are all hereby incorporated herein in their entirety by reference.

TECHNICAL FIELD

This application pertains to the field of virtual reality device, in particular to an eyeball tracking method and a virtual reality device.

BACKGROUND

In order to realize particular functions, the virtual reality device needs to track the user's eyeball. When performing eyeball tracking, a camera with a large field of view may be used to capture images including the user's eye, and further track the user's eyeball. During eyeball tracking in this way, if the field of view is too large, there will be the phenomenon that distortion occurs at the edge of the image captured by the camera, so that when the distorted image is used for eyeball tracking, the accuracy of eyeball tracking is low. In addition, other objects, desirable features and characteristics will become apparent from the subsequent summary and detailed description, and the appended claims, taken in conjunction with the accompanying drawings and this background.

SUMMARY

The main object of the present disclosure is to provide an eyeball tracking method and a virtual reality device, which can solve the technical problem of low eyeball tracking accuracy.

In order to achieve the above object, the present disclosure provides an eyeball tracking method, the eyeball tracking method is applied to a virtual reality device, the virtual reality device comprises at least two cameras, and shooting areas of the cameras are partially overlapped, and the eyeball tracking method comprises:

acquiring images captured by at least two cameras at a same moment;

superimposing overlapping areas in the images to obtain a target image including an eyeball area; and performing eyeball tracking according to the target image.

Optionally, the eyeball tracking method further comprises:

acquiring an image captured by a preset camera, wherein a quantity of the preset camera is one;

judging whether the image captured by the preset camera includes the eyeball area;

when the image captured by the preset camera does not include the eyeball area, activating at least two of the cameras, and performing the step of acquiring images captured by at least two of the cameras at the same moment; and when the image captured by the preset camera includes the eyeball area, performing eyeball tracking according to the image captured by the preset camera.

Optionally, the step of judging whether the image captured by the preset camera includes the eyeball area comprises:

acquiring a quantity of light spots in the image captured by the preset camera; and judging whether the quantity of light spots is greater than or equal to a preset quantity of light spots, wherein, when the quantity of light spots is greater than or equal to the preset quantity of light spots, it is determined that the eyeball area is included in the image captured by the preset camera, and when the quantity of light spots is less than the preset quantity of light spots, it is determined that the eyeball area is not included in the image captured by the preset camera.

Optionally, the step of acquiring the quantity of light spots in the image captured by the preset camera comprises:

acquiring a brightness value of each pixel in the image captured by the preset camera;

determining a pixel whose brightness value is within a preset brightness range as a target pixel;

determining an area formed by the target pixels as the light spot; and determining the quantity of light spots in the image captured by the preset camera.

Optionally, the step of performing eyeball tracking according to the target image comprises:

tracking the position of the eyeball according to positions of the light spots in the target image.

Optionally, after the step of acquiring images captured by at least two of the cameras at the same moment, the method further comprises:

determining a target area in each of the images, wherein the target area is an area whose distortion degree is within a preset range of distortion degree; and cropping the target area in the image from each of the images to obtain target images.

the step of superimposing overlapping areas in the images to obtain a target image including an eyeball area including the eyeball region comprises:

superimposing overlapping areas in the target images to obtain the target image including the eyeball area.

Optionally, the step of determining the target area in each of the images comprises:

determining a standard imaging height of each pixel in the image and an actual imaging height of the pixel, wherein the standard imaging height is a distance from the pixel to an optical axis of the camera when an image collected by the camera does not produce distortion, and the actual imaging height is a distance from the pixel to the optical axis of the camera in an actually captured image;

determining a distortion rate of each of the pixels of each of the images according to the standard imaging height and the actual imaging height of each of the images; and determining, in each of the images, an area where the pixels whose distortion rate is smaller than a preset distortion rate are located as the target area.

Optionally, before the step of superimposing overlapping areas in the images to obtain the target image including the eyeball area, the method further comprises:

extracting feature points in each of the images, wherein the feature point is a pixel whose absolute value of difference of gray values with adjacent pixels is greater
than a preset difference; and determining matching feature points between the two
images as the overlapping area.

In addition, in order to achieve the above object, the
present disclosure also provides a virtual reality device. The
virtual reality device comprises at least two cameras, a
processor, a memory; and an eyeball tracking program that
is stored on the memory and operable on the processor. The
shooting areas of the cameras partially overlap. When the
eyeball tracking program is executed by the processor, the
steps of the eyeball tracking method described in any one of
the above items are implemented.

Optionally, the virtual reality device further comprises an
optical module, a quantity of the cameras is two, the two
cameras are provided on an outer surface of the optical
module that is on a light-emitting side, and the two cameras
are symmetrically distributed along a center of the outer
surface.

The eyeball tracking method and virtual reality device
proposed by the embodiments of the present disclosure
acquire images captured by at least two cameras at the same
moment, superimpose overlapping areas in the images to
obtain a target image including an eyeball area, and perform
eyeball tracking according to the target image. Thus, two
cameras can be used to take different images, so as to
achieve the effect of shooting different areas of the eyeball.
The overlapping areas of the images are superimposed, so as
to realize image splicing, and obtain the target image includ-
ing the eyeball area. The eyeball area included in the target
image is more complete. When performing eyeball tracking
based on the target image, it can avoid inaccurate eyeball
tracking caused by the incompleteness of the eyeball area,
thereby improving the accuracy of eyeball tracking.

BRIEF DESCRIPTION OF DRAWINGS

The present invention will hereinafter be described in
conjunction with the following drawing figures, wherein like
numerals denote like elements, and:

FIG. 3 is a schematic flow chart of a second embodiment
of the eyeball tracking method of the present disclosure;

FIG. 4 is a schematic flowchart of a third embodiment of
the eyeball tracking method of the present disclosure;

FIG. 5 is a schematic flowchart of a fourth embodiment of
the eyeball tracking method of the present disclosure.

The realization of the object, functional characteristics
and advantages of the present disclosure will be further
described in conjunction with the embodiments and with
reference to the accompanying drawings.

DETAILED DESCRIPTION

The following detailed description is merely exemplary in
nature and is not intended to limit the invention or the
application and uses of the invention. Furthermore, there is
no intention to be bound by any theory presented in the
preceding background of the invention or the following
detailed description.

It should be understood that the specific embodiments
described here are only used to explain the present disclo-
sure, not to limit the present disclosure.

Figure 1:
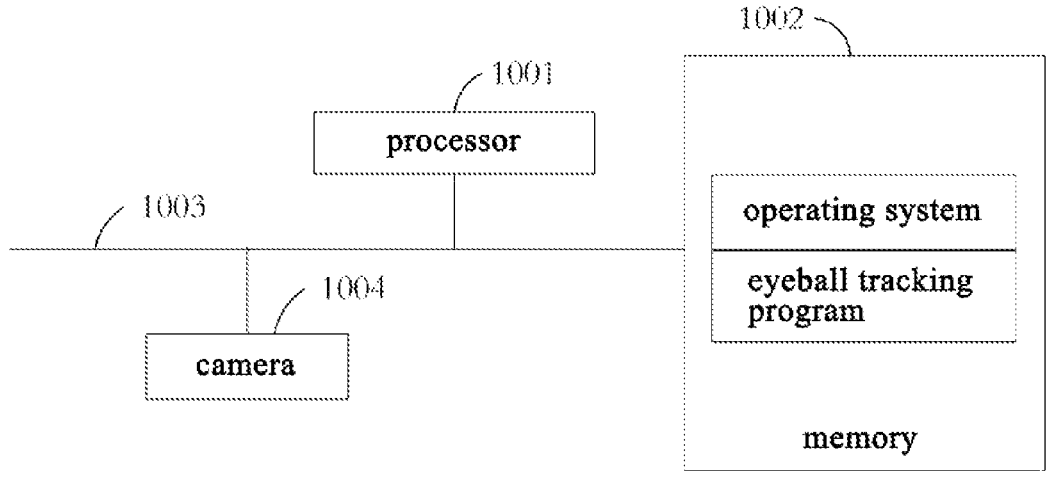
FIG. 1 is a schematic diagram of the structure of a virtual
reality device involved in embodiments of the present dis-
closure.

FIG. 1 is a schematic diagram of the structure of a virtual
reality device involved in embodiments of the present dis-
closure.

As shown in FIG. 1, the virtual reality device may
comprise: a processor 1001 (such as a CPU), a memory
1002, a communication bus 1003, and a camera 1004. The
communication bus 1003 is used to realize connection and
communication between these components. The memory
1002 may be a high-speed RAM memory, or a non-volatile
memory, such as a disk memory. Optionally, the memory
1002 may also be a storage device independent of the
processor 1001.

Those skilled in the art can understand that the virtual
reality device shown in FIG. 1 does not constitute a limita-
tion on the virtual reality device, and the virtual reality
device may comprise more or fewer components than those
shown in the FIG. 1, or be a combination of some compo-
nents, or have different component arrangements.

As shown in FIG. 1, the memory 1002, as a type of
computer storage medium, may comprise an operating sys-
tem and an eyeball tracking program.

In the virtual reality device shown in FIG. 1, the processor
1001 may be used to call the eyeball tracking program stored
in the memory 1002, and perform the following operations:

acquiring images captured by at least two cameras at a
same moment;

superimposing overlapping areas in the images to obtain
a target image including an eyeball area; and performing eyeball tracking according to the target image.

Further, the processor 1001 may call the eyeball tracking
program stored in the memory 1002, and further perform the
following operations:

acquiring an image captured by a preset camera, wherein
a quantity of the preset camera is one;

judging whether the image captured by the preset camera
includes the eyeball area;

when the image captured by the preset camera does not
include the eyeball area, activating at least two of the
cameras, and performing the step of acquiring images
captured by at least two of the cameras at the same
moment; and when the image captured by the preset camera includes
the eyeball area, performing eyeball tracking according
to the image captured by the preset camera.

Further, the processor 1001 may call the eyeball tracking
program stored in the memory 1002, and further perform the
following operations:

acquiring a quantity of light spots in the image captured
by the preset camera; and judging whether the quantity of light spots is greater than
or equal to a preset quantity of light spots, wherein,
when the quantity of light spots is greater than or equal
to the preset quantity of light spots, it is determined that
the eyeball area is included in the image captured by the
preset camera, and when the quantity of light spots is
less than the preset quantity of light spots, it is deter-
mined that the eyeball area is not included in the image
captured by the preset camera.

Further, the processor 1001 may call the eyeball tracking
program stored in the memory 1002, and further perform the
following operations:

acquiring a brightness value of each pixel in the image
captured by the preset camera;

determining a pixel whose brightness value is within a preset brightness range as a target pixel;

determining an area formed by the target pixels as the light spot; and determining the quantity of light spots in the image captured by the preset camera.

Further, the processor 1001 may call the eyeball tracking program stored in the memory 1002, and further perform the following operations:

tracking the position of the eyeball according to positions of the light spots in the target image.

Further, the processor 1001 may call the eyeball tracking program stored in the memory 1002, and further perform the following operations:

determining a target area in each of the images, wherein the target area is an area whose distortion degree is within a preset range of distortion degree;

cropping the target area in the image from each of the images to obtain target images; and superimposing overlapping areas in the target images to obtain the target image including the eyeball area.

Further, the processor 1001 may call the eyeball tracking program stored in the memory 1002, and further perform the following operations:

determining a standard imaging height of each pixel in the image and an actual imaging height of the pixel, wherein the standard imaging height is a distance from the pixel to an optical axis of the camera when an image collected by the camera does not produce distortion, and the actual imaging height is a distance from the pixel to the optical axis of the camera in an actually captured image;

determining a distortion rate of each of the pixels of each of the images according to the standard imaging height and the actual imaging height of each of the images; and determining, in each of the images, an area where the pixels whose distortion rate is smaller than a preset distortion rate are located as the target area.

Further, the processor 1001 may call the eyeball tracking program stored in the memory 1002, and further perform the following operations:

extracting feature points in each of the images, wherein the feature point is a pixel whose absolute value of difference of gray values with adjacent pixels is greater than a preset difference; and determining matching feature points between the two images as the overlapping area.

Figure 2:
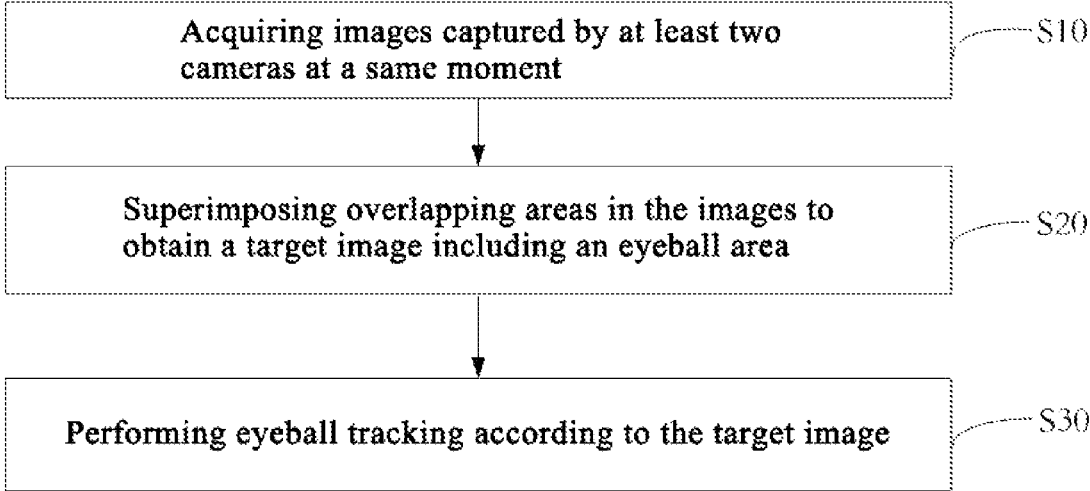
FIG. 2 is a schematic flow chart of a first embodiment of
the eyeball tracking method of the present disclosure.

Referring to FIG. 2, the first embodiment of the present disclosure provides an eyeball tracking method, which comprises:

Step S10, acquiring images captured by at least two cameras at a same moment.

In this embodiment, the executor is a virtual reality device. The virtual reality device in this embodiment comprises at least two cameras, and the shooting areas of the cameras partially overlap.

When the virtual reality device performs eyeball tracking, it needs to capture images of the human eye area through the camera, and use the images to realize eyeball tracking. Specifically, an infrared light source may be used to irradiate the human eye area. Based on the optical characteristics of the human eye, a light spot will be formed on the human eye, which can be collected by an infrared camera. When the eyeball rotates, the light spot on the eyeball will move accordingly. The number and position of light spots on the cornea of the human eye when facing the front are different from those when the human eye's line of sight is tilted. Based on this, the eyeball and line of sight can be tracked by using the light spots. However, when one camera is used to takes photos of the human eye, since the field of view of the camera itself may be small, when the light spot on the cornea is on the side that deviates from the camera, the field of view of the camera may not be able to cover the area where the light spot on the cornea is located. As a result, the quantity of light spots is incomplete and the tracking is inaccurate when the eyeball is tracked by using the light spot. In order to allow a single camera to capture the complete eye area, the field of view of the camera may be increased to cover the complete area. However, in the process of increasing the field of view of the camera, due to the characteristics of the optical lens group in the camera, the edge of the captured image will be distorted, and the light spot may be distributed in the edge part where there is distortion, and thus the position of the light spot itself is not accurate. When the eyeball position is tracked by using the position of the light spot, the eyeball tracking is also inaccurate. In order to solve the above problem, this embodiment uses two cameras to capture the area where the same eyeball is located. It is understandable that in order to allow the two cameras capture the area where the same eyeball is located, the shooting angles of the two cameras in the virtual reality device may be adjusted in advance to achieve the object of capturing the area where the same eyeball is located. It should be noted that, when superimposing the images, each image needs to have an overlapping area. In order to make each image have an overlapping area, the position and angle of the camera may be set in advance. For example, two cameras may be distributed on symmetrical sides to capture different areas, so that when the target image including the eyeball area is obtained, the eyeball tracking can be performed according to the target image. At this moment, the image is more complete, and the quantity of light spots is more complete, so that the accuracy of eyeball tracking can be improved when performing the eyeball tracking according to the position of the light spot.

The quantity of cameras in this embodiment is more than two. When the images are spliced, it is necessary to superimpose overlapping areas, and the position of eyeball changes in real time, so it is necessary to obtain images captured by each camera at the same moment. The quantity of cameras may be set to two or more than two. The purpose of providing two cameras is to, while improving the accuracy of eyeball tracking, avoid excessive power consumption caused by too many cameras working simultaneously.

Step S20, superimposing overlapping areas in the images to obtain a target image including an eyeball area.

After the images is obtained, the overlapping areas in the images are superimposed to splice the images into one image. When splicing, it is necessary to first determine the overlapping areas. The determination method is to extract feature points in each image. The feature point is a pixel whose absolute value of difference with gray values of adjacent pixels is greater than a preset difference. Alternatively, the feature point may also be regarded as a point with a large curvature on the edge of the image, that is, the intersection point of the two edges. When extracting feature points, the SIFT (Scale Invariant Feature Transform) may be used to extract feature points. After extracting feature points, the matching feature points between the two images are determined as the overlapping area, and the feature matching is performed. When the feature matching is performed, the Brute Force Matcher may be used for image splicing.

The eyeball area refers to the entire area where the eyeball structures that can form light spots are located. The target image is an image obtained by superimposing overlapping areas, and is used for eyeball tracking.

Step S30, performing eyeball tracking according to the target image.

After obtaining the target image, the eyeball position is tracked according to positions of the light spots in the target image. Alternatively, if other methods are used to realize eyeball tracking, such as eyeball tracking based on the bright pupil image and the dark pupil image in the image, it may also be that, through all the methods described in this embodiment, the target image is obtained by acquiring images and then superimposing overlapping areas, and the eyeball tracking is performed based on the target image, thereby achieving the effect of improving the accuracy of eyeball tracking.

In this embodiment, a target image including the eyeball area is obtained by acquiring images captured by at least two cameras and superimposing overlapping areas in the images, and the eyeball tracking is performed according to the target image. Thus, two cameras can be used to take different images, so as to achieve the effect of shooting different areas of the eyeball. The overlapping areas of each image are superimposed, so as to realize image splicing, and obtain the target image including the eyeball area. The eyeball area included in the target image is more complete. When performing eyeball tracking based on the target image, it can avoid incompleteness of the eyeball area, thereby improving the accuracy of eyeball tracking.

Referring to FIG. 3, the second embodiment of the present disclosure provides an eyeball tracking method. Based on the first embodiment shown in FIG. 2 above, the eyeball tracking method further comprises:

Step S40, acquiring an image captured by a preset camera, wherein the quantity of the preset camera is one.

In the case of performing the eyeball tracking through two cameras, since if the two cameras work at the same time, the power consumption of the virtual reality device will increase, in this embodiment, only when the accuracy of eyeball tracking based on images collected by a single camera is low, the images captured by more than two cameras are used to perform the eyeball tracking: and when the images captured by a single camera can meet the accuracy requirements of eyeball tracking, the images captured by a single camera are used to perform the eyeball tracking, thereby reducing the power consumption of the virtual reality device.

The preset camera is a camera set in advance, and is used to determine whether two cameras need to be activated according to images captured by the preset camera itself. The preset camera can be activated after detecting that the virtual reality device is activated.

Step S50, judging whether the image captured by the preset camera includes the eyeball area.

The eyeball area in this embodiment is a pre-designated area that includes a certain part of the eyeball. For example, the eyeball area is a preset area that includes a complete eyeball structure. When it is judged whether the image captured by the preset camera includes the eyeball, the image of the eyeball may be detected by an image recognition algorithm and compared with the preset image of the complete eyeball area to judge whether the eyeball part in the captured image is complete. When it is complete, it can be regarded that the image captured by the preset camera includes the eyeball area. Alternatively, when the eyeball tracking is implemented by using the light spots in the eyeball, whether the eyeball part is complete may be indirectly determined through the quantity of light spots. When it is complete, it can be determined that the image captured by the preset camera includes the eyeball area.

Step S60, when the image captured by the preset camera does not include the eyeball area, activating at least two of the cameras, and performing the step of acquiring images captured by at least two of the cameras at the same moment.

When the image captured by the preset camera does not include the eyeball area, if the eyeball tracking is performed by using the image captured by the preset camera, it will result in a low accuracy of eyeball tracking. At this moment, the eyeball tracking is performed by using the images captured by at least two cameras to improve the accuracy of eyeball tracking. When the cameras are activated, the at least two cameras activated include the preset camera.

Step S70, when the image captured by the preset camera includes the eyeball area, performing eyeball tracking according to the image captured by the preset camera.

When the image captured by the preset camera includes the eyeball area, in order to reduce power consumption, only the image captured by the preset camera is used to perform the eyeball tracking. The eyeball tracking method includes, but is not limited to, the eyeball tracking by using the position of the light spot in the image, and the line of sight may also be tracked according to the position of the light spot.

In this embodiment, the image captured by the preset camera is acquired, and it is judged whether the image captured by the preset camera includes the eyeball area; when the image captured by the preset camera does not include the eyeball area, at least two cameras are activated, and the images captured by at least two cameras at the same moment are obtained and further used to perform the eyeball tracking: when the image captured by the preset camera includes the eyeball area, the eyeball tracking is performed based on the image captured by the preset camera. Thus, when the accuracy of eyeball tracking by using images captured by a single camera is high, the eyeball tracking is performed by only using images captured by a single camera, thereby reducing the power consumption; on the other hand, when the accuracy of eyeball tracking by using images captured by a single camera is low, the eyeball tracking is performed by using images captured by at least two cameras, thereby improving the accuracy of eyeball tracking.

Referring to FIG. 4, the third embodiment of the present disclosure provides an eyeball tracking method. Based on the second embodiment shown in FIG. 3, the step S50 comprises:

Step S51, acquiring a quantity of light spots in the image captured by the preset camera.

When judging whether the image captured by the preset camera includes the eyeball area, it may also be judged by the quantity of light spots in the image. The reason lies in that, in the captured image, only the eyeball part has light spots, and in the case of incomplete shooting, the area at the edge of the eyeball may not be captured, and at this moment the light spots at the edge of the eyeball may not be captured. Therefore, if the captured image includes the eyeball area, or includes the complete eyeball area, the quantity of light spots should be greater than the preset standard. For example, if the quantity of infrared light sources is 8, then the quantity of light spots formed on the cornea is also 8. If the quantity of light spots reaches 8, then it indicates that the captured image is complete, i.e., the captured image includes the eye area.

In addition, when acquiring the quantity of light spots, it needs to determine which part of the image belongs to the light spot. Therefore, this embodiment acquires the brightness value of each pixel in the image captured by the preset camera, and according to the brightness characteristics of the light spot, determines the pixels whose brightness value is within a preset brightness range as target pixels, and determines the area formed by the target pixels as the light spot, thereby determining the light spots in the image, and further calculating the quantity of light spots in the image captured by the preset camera.

Step S52, judging whether the quantity of light spots is greater than or equal to a preset quantity of light spots, wherein, when the quantity of light spots is greater than or equal to the preset quantity of light spots, it is determined that the eyeball area is included in the image captured by the preset camera, and when the quantity of light spots is less than the preset quantity of light spots, it is determined that the eyeball area is not included in the image captured by the preset camera.

After determining the quantity of light spots, if the quantity of light spots is greater than or equal to the preset quantity of light spots, it indicates that the eyeball part has been completely captured. At this moment, it is determined that the image captured by the preset camera includes the eyeball area. If the quantity of light spots is less than the preset quantity of light spots, it indicates that the eyeball part has not been completely captured. At this moment, it is determined that the image captured by the preset camera does not include the eyeball area. After the overlapping areas of the images are superimposed, the position of the eyeball is tracked according to the positions of light spots in the target image. When performing the eyeball tracking by using the positions of light spots, the coordinates of the light spots may be determined, and the coordinates of the pupil is determined based on the coordinates of the light spots, and the eyeball tracking is performed according to the coordinates of the pupil.

In this embodiment, by acquiring the brightness value of each pixel in the image captured by the preset camera, determining the pixels whose brightness value is within a preset brightness range as target pixels, and determining the area formed by the target pixels as the light spot, the light spots in the image are determined, and the quantity of light spots in the image is further determined, so that the quantity of light spots in the image is calculated, and it is judged whether the image includes the eyeball area according to the quantity of light spots. The judgment method is simple, and the judgment efficiency is high.

Referring to FIG. 5, the fourth embodiment of the present disclosure provides an eyeball tracking method. Based on the first embodiment shown in FIG. 2, after the step S10, the method further comprises:

Step S80, determining a target area in each of the images, wherein the target area is an area whose distortion degree is within a preset range of distortion degree;

Step S90, cropping the target area in the image from each of the images to obtain target images.

The target area is an area composed of pixels in the image whose distortion degree is within the preset range of distortion. The distortion degree is the degree to which the position of the pixel in the image deviates from its standard position. The preset range of distortion degree is a parameter defining the acceptable range of distortion degree. The overlapping area refers to the area composed of the same pixels among target areas. Cropping refers to separating the target area from the image, and after cropping, the target area that does not include other parts of the image is obtained.

After acquiring the images captured by the cameras, in order to avoid the interference caused by image distortion, it is necessary to extract from the image the area with a small distortion degree, i.e., the area where the distortion degree is within a preset range of distortion. The images captured corresponding to different fields of view of the camera are different in distortion degree. When the field of view is relatively large, the distortion degree is relatively large; when the field of view is relatively small, the distortion degree is relatively small. Moreover, when the image is distorted, the distortion degree of each pixel in the image is characterized in that the distortion degree gradually increases from the center to the periphery of the image. Therefore, when determining the target area, a part of the central area of the image may be selected as the target area. In order to determine the target area, the standard imaging height and the actual imaging height of the pixels in each image may be determined. The standard imaging height is the distance from the pixel to the optical axis of the camera when there is no distortion in the image. The actual imaging height is the distance from the pixel to the optical axis in the actually captured image. The shorter the focal length of the camera, the larger the field of view, and the greater the distortion degree. When the light passes through the center of the lens of the camera, it deviates and produces distortion. When the distortion occurs, the pixels in the image deviate from their original positions. In this embodiment, the standard imaging height and the actual imaging height are defined with the optical axis as a reference, and the distortion rate of each pixel of each image is further determined according to the standard imaging height and the actual imaging height of each image.

In this embodiment, the distortion rate is used to measure the distortion degree of the image. The larger the distortion rate, the greater the distortion degree. The calculation method of the distortion rate may be, determining the difference between the actual imaging height and the standard imaging height, and taking the ratio of the difference to the standard imaging height as the distortion rate. In addition, the distortion rate may also be determined according to the standard imaging height, the actual imaging height, and the focal length of the camera. In each image, the area where the pixels whose distortion rate is less than the preset distortion rate are located is determined as the target area.

The preset distortion rate is a preset parameter indicating the distortion degree of the pixels in the image, and is used to describe the acceptable degree of image distortion. When the distortion rate is less than the preset distortion rate, the distortion degree of the image is acceptable. Therefore, the area where the pixels whose distortion rate is smaller than the preset distortion rate are located can be used as the target area, so as to obtain an area with a smaller distortion degree.

The step S20 comprises:

Step S21, superimposing overlapping areas in the target image to obtain the target image including the eyeball area.

After obtaining the target area of each image whose distortion degree is within the preset distortion degree range, the target areas need to be spliced to obtain the target image. When the human eye images are captured by two cameras, the images captured by the two cameras may still be distorted. Therefore, this embodiment acquires the target area whose distortion degree is within the preset distortion degree range in the two images, and superimposes the target areas to obtain the target image, thereby reducing the interference of distortion on the eyeball tracking.

In this embodiment, the standard imaging height of the pixels in each image and the actual imaging height of the pixels are determined, the distortion rate of each pixel of each image is determined according to the standard imaging height and the actual imaging height of each image, and in each image, the area where the pixels with a distortion rate less than the preset distortion rate are located is determined as the target area, thereby determining the target area. The method of determining the target area is relatively simple, and the efficiency is high. Moreover, the target area with a small distortion degree is obtained, and the cropped target areas are superimposed to obtain the target image, so that the distortion of the target image is smaller, and the accuracy of eyeball tracking can be further improved.

Figure 6:
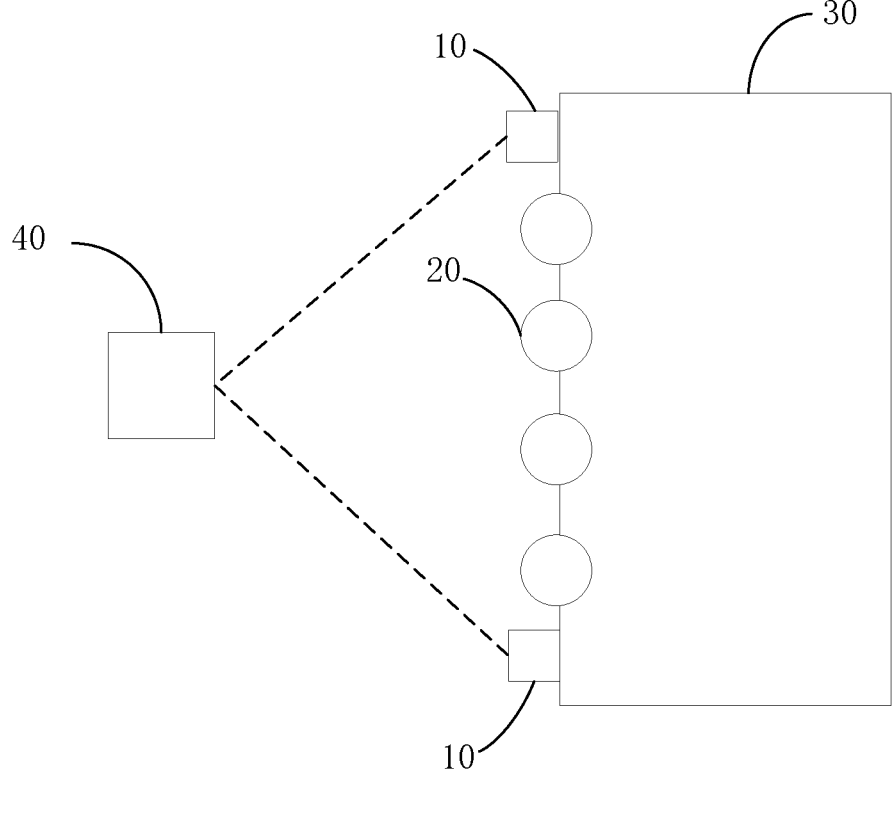
FIG. 6 is a schematic diagram of an embodiment of a
virtual reality device involved in the eyeball tracking
method of the present disclosure.

Referring to FIG. 6, another embodiment of the present disclosure provides a virtual reality device. The virtual reality device comprises an eyeball tracking program, and when the eyeball tracking program is executed by a processor, the eyeball tracking method described in any of the above embodiments can be executed. The virtual reality device comprises two cameras 10, through which images of different areas can be captured, thereby acquiring a more complete image by splicing. When making the shooting areas overlap, a proper angle and position may be set to make the shooting areas overlap. The virtual reality device further comprises an optical module 30, the quantity of cameras 10 is two, and the two cameras 10 are provided on the outer surface of the optical module 30 that is on the light-emitting side, and the two cameras are symmetrically distributed along the center of the outer surface. The camera 10 is an infrared camera, and the virtual reality device further comprises an infrared light source 20. The infrared light source may be distributed around the light-emitting side of the optical module. The number of infrared light sources may be set as needed, such as 8. The infrared light source 20 is used to form an infrared spot on the eyeball, and the infrared camera is used to capture infrared images which include infrared light spots. FIG. 6 shows the distribution of cameras corresponding to a single eyeball. In order to capture two eyeballs, another two cameras may be further provided to capture images of the other eyeball.

It should be noted that, the terms "comprise", "include" or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article, or apparatus including the element.

The above serial numbers of the embodiments of the present disclosure are only for description and do not represent the priority order of the embodiments.

Through the above description of the embodiments, those skilled in the art can clearly understand that the methods of the embodiments can be implemented by means of software plus the necessary general hardware platform. Of course, it can also be implemented by hardware, but in many cases, the former is the better implementation method. Based on this understanding, the technical solution of the present disclosure, in essence or the part that contributes to the prior art, can be embodied in the form of a software product, which is stored on the above storage medium (such as ROM/RAM, magnetic disc, optical disc), and includes instructions to enable a mobile terminal (which may be a mobile phone, a computer, a server, an air conditioner, or a network device, etc.) to execute the method of each embodiment of the present disclosure.

The above only describes the preferred embodiments of the present disclosure, and does not limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. An eyeball tracking method, wherein the eyeball tracking method is applied to a virtual reality device, the virtual reality device comprises at least two cameras, and shooting areas of the cameras are partially overlapped, and the eyeball tracking method comprises:

acquiring an image captured by a preset camera, wherein a quantity of the preset camera is one;

judging whether the image captured by the preset camera includes an eyeball area, wherein the eyeball area refers to the entire area where the eyeball structures that can form light spots are located;

when the image captured by the preset camera does not include the eyeball area, activating at least two of the cameras, and acquiring images including different areas of the eyeball area captured by at least two cameras at a same moment;

superimposing overlapping areas in the images to obtain a target image including the complete eyeball area; and performing eyeball tracking according to the target image.

2. The eyeball tracking method according to claim 1, further comprising:

when the image captured by the preset camera includes the eyeball area, performing eyeball tracking according to the image captured by the preset camera.

3. The eyeball tracking method according to claim 2, wherein the step of judging whether the image captured by the preset camera includes the eyeball area comprises:

acquiring a quantity of light spots in the image captured by the preset camera; and judging whether the quantity of light spots is greater than or equal to a preset quantity of light spots, wherein, when the quantity of light spots is greater than or equal to the preset quantity of light spots, it is determined that the eyeball area is included in the image captured by the preset camera, and when the quantity of light spots is less than the preset quantity of light spots, it is determined that the eyeball area is not included in the image captured by the preset camera.

4. The eyeball tracking method according to claim 3, wherein the step of acquiring the quantity of light spots in the image captured by the preset camera comprises:

acquiring a brightness value of each pixel in the image captured by the preset camera;

determining a pixel whose brightness value is within a preset brightness range as a target pixel;

determining an area formed by the target pixels as the light spot; and determining the quantity of light spots in the image captured by the preset camera.

5. The eyeball tracking method according to claim 4, wherein the step of performing eyeball tracking according to the target image comprises:

tracking the position of the eyeball according to positions of the light spots in the target image.

6. The eyeball tracking method according to claim 1, wherein after the step of acquiring images including different areas of the eyeball area captured by at least two of the cameras at the same moment, the method further comprises:

determining a target area in each of the images, wherein the target area is an area whose distortion degree is within a preset range of distortion degree; and cropping the target area in the image from each of the images to obtain target images;

the step of superimposing overlapping areas in the images to obtain a target image including the complete eyeball area including the eyeball region comprises:

superimposing overlapping areas in the target images to obtain the target image including the complete eyeball area.

7. The eyeball tracking method according to claim 6, wherein the step of determining the target area in each of the images comprises:

determining a standard imaging height of each pixel in the image and an actual imaging height of the pixel, wherein the standard imaging height is a distance from the pixel to an optical axis of the camera when an image collected by the camera does not produce distortion, and the actual imaging height is a distance from the pixel to the optical axis of the camera in an actually captured image;

determining a distortion rate of each of the pixels of each of the images according to the standard imaging height and the actual imaging height of each of the images; and determining, in each of the images, an area where the pixels whose distortion rate is smaller than a preset distortion rate are located as the target area.

8. The eyeball tracking method according to claim 1, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

9. The eyeball tracking method according to claim 2, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

10. The eyeball tracking method according to claim 3, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

11. The eyeball tracking method according to claim 4, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

12. The eyeball tracking method according to claim 5, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

13. The eyeball tracking method according to claim 6, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

14. The eyeball tracking method according to claim 7, wherein before the step of superimposing overlapping areas in the images to obtain the target image including the complete eyeball area, the method further comprises:

extracting feature points in each of the images, wherein the feature points are pixels whose absolute value of difference of gray values with adjacent pixels is greater than a preset difference; and determining matching feature points between the two images as the overlapping area.

15. A virtual reality device comprising at least two cameras, a processor, a memory, and an eyeball tracking program that is stored on the memory and operable on the processor, wherein shooting areas of the cameras partially overlap, and when the eyeball tracking program is executed by the processor, the following steps are realized:

acquiring an image captured by a preset camera, wherein a quantity of the preset camera is one;

judging whether the image captured by the preset camera includes the eyeball area, wherein the eyeball area refers to the entire area where the eyeball structures that can form light spots are located;

when the image captured by the preset camera does not include the eyeball area, activating at least two of the cameras, and acquiring images including different areas of the eyeball area captured by at least two cameras at a same moment;

superimposing overlapping areas in the images to obtain a target image including an eyeball area; and performing eyeball tracking according to the target image.

16. The virtual reality device according to claim 15, wherein the virtual reality device further comprises an optical module, a quantity of the cameras is two, the two cameras are provided on an outer surface of the optical module that is on a light-emitting side, and the two cameras are symmetrically distributed along a center of the outer surface.

17. The virtual reality device according to claim 15, when the eyeball tracking program is executed by the processor, the following step is further realized:

when the image captured by the preset camera includes the eyeball area, performing eyeball tracking according to the image captured by the preset camera.

18. The virtual reality device according to claim 17, wherein the step of judging whether the image captured by the preset camera includes the eyeball area comprises:

acquiring a quantity of light spots in the image captured by the preset camera; and judging whether the quantity of light spots is greater than or equal to a preset quantity of light spots, wherein, when the quantity of light spots is greater than or equal to the preset quantity of light spots, it is determined that the eyeball area is included in the image captured by the preset camera, and when the quantity of light spots is less than the preset quantity of light spots, it is determined that the eyeball area is not included in the image captured by the preset camera.

19. The virtual reality device according to claim 15, wherein when the eyeball tracking program is executed by the processor, the following steps are further realized:

after the step of acquiring images captured by at least two of the cameras at the same moment, determining a target area in each of the images, wherein the target area is an area whose distortion degree is within a preset range of distortion degree; and cropping the target area in the image from each of the images to obtain target images;

the step of superimposing overlapping areas in the images to obtain a target image including an eyeball area including the eyeball region comprises:

superimposing overlapping areas in the target images to obtain the target image including the complete eyeball area.

20. The virtual reality device according to claim 15, wherein when the eyeball tracking program is executed by the processor, the following steps are further realized:

before the step of superimposing overlapping areas in the images to obtain the target image including the complete eyeball area, extracting feature points in each of the images, wherein the feature points are pixels whose absolute value of difference of gray values with adjacent pixels is greater than a preset difference; and determining matching feature points between the two images as the overlapping area.

* * * * *